Patented Sept. 21, 1948

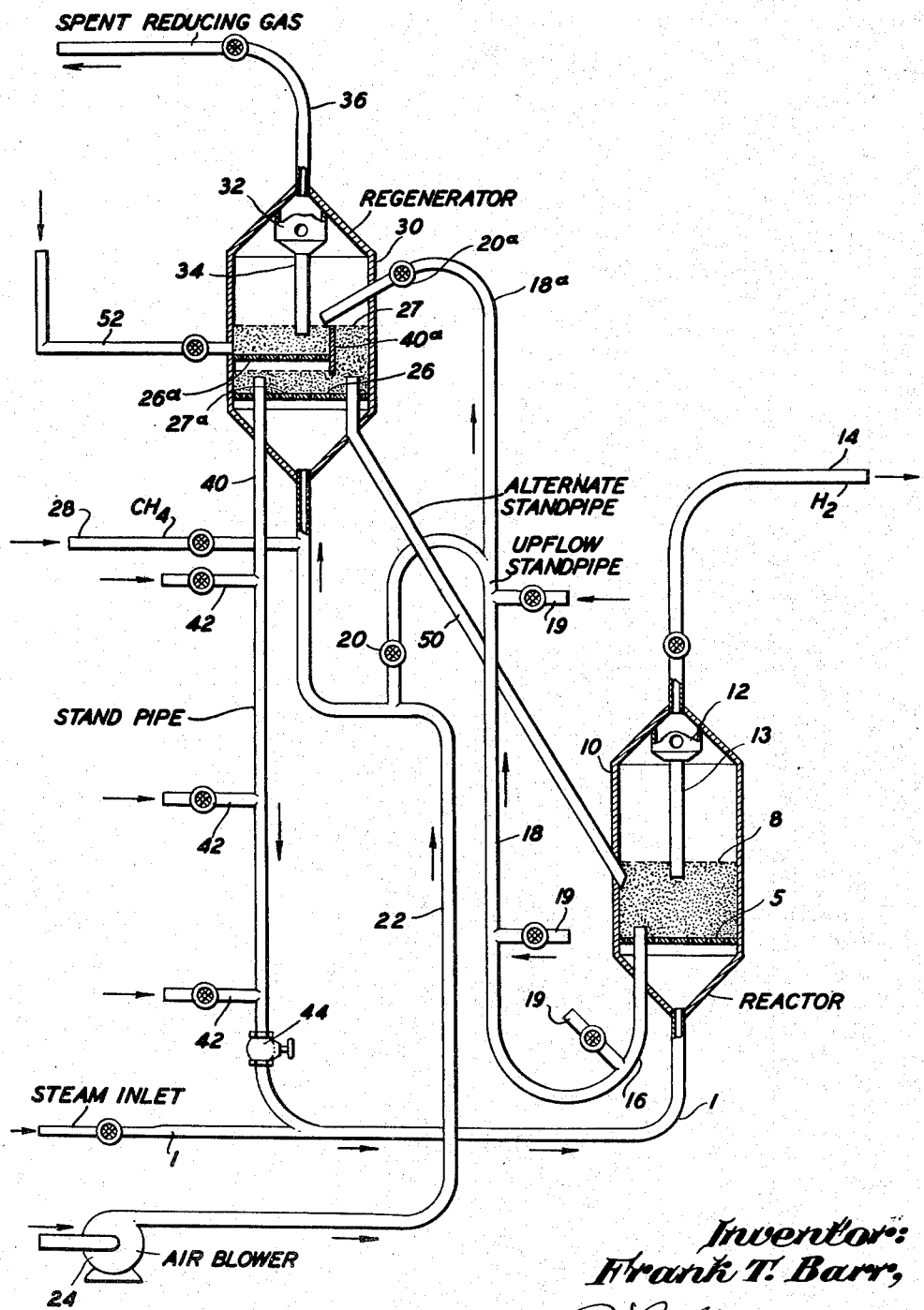

2,449,635

UNITED STATES PATENT OFFICE 2,449,635

PRODUCTION OF HYDROGEN

Frank T. Barr, Summit, N. J., assignor, by mesne assignments, to Standard Catalytic Company, a corporation of Delaware Application October 9, 1946, Serial No. 702,301
In Canada March 19, 1943

3 Claims. (Cl. 23—214)

The present invention relates to the production of hydrogen, in particular, to high pressure hydrogen for synthesis processes. The invention will be fully understood from the following description and the drawing.

This application contains subject matter which was, in part, disclosed and claimed in my abandoned application Serial No. 432,563, filed February 27, 1942.

Heretofore hydrogen has been produced by reaction of metals such as iron and superheated steam in which reaction the steam is reduced by the metal at elevated temperature with the simultaneous formation of a metal oxide. In a subsequent step the metal oxide is reduced, for example by water gas, and can be reused for further hydrogen production.

Such processes have heretofore been operated intermittently using a cyclic system of fixed bed reactors alternating between hydrogen producing and metal reducing stages. Systems of this type suffer greatly from various inherent economical and technical disadvantages.

For instance, product quality and yields suffer from the inefficiency of the cyclic purging procedure required and change during the process of each producing cycle because of the change in temperature and/or pressure with time. The rate of conversion is low requiring extremely high temperatures as a result of the small surface of the metal which must be used in the form of relatively large lumps to avoid excessive pressure drop across the metal bed. These high temperatures weaken the physical structure of the metal lumps by sintering, spalling or the like which causes plugging and channelling.

When high pressure hydrogen is to be produced not only the reacting steam supplied during the production stage but also the reducing gases used in the reduction stage must be compressed to high pressures unless depressuring and repressuring in each cycle is undertaken, a step which is time consuming, complicates operation and reduces capacity. The cost of compressing the extremely large quantities of reducing gas required is close to prohibitive commercially and no appreciable savings are obtained by alternate depressuring and repressuring the reactors for the reducing and producing cycles. For these reasons the conventional metal-steam process has failed to assume commercial importance for the production of hydrogen at high pressures as is desirable for various syntheses, for example high pressure hydrogenation of carbonaceous materials, hydrocarbon synthesis from CO and $H_2$ in the presence of iron-type catalysts, etc.

The present invention overcomes the aforementioned difficulties and affords various additional advantages as will be fully understood from the following detailed description.

It is, therefore, the principal object of the present invention to provide an improved method of producing hydrogen by the reduction of steam.

Another object of my invention is to provide an improved continuous process for the production of hydrogen by the reduction of steam without the disadvantages of fixed bed intermittent operation.

A more specific object of the present invention is to provide an improved continuous process for the production of high pressure hydrogen by the reduction of steam with metalliferous reducing agents wherein the reducing agent is oxidized and regenerated by reduction and wherein the regeneration of the reducing agent may be carried out at a lower pressure than the steam reduction without affecting the economies of the process.

Other objects and advantages will become apparent from the following disclosure and claims.

In accordance with the present invention, the steam to be reduced to hydrogen is contacted in a hydrogen generation zone at reducing conditions of temperature and pressure with a dense turbulent ebullient mass of a finely divided solid metalliferous reducing agent such as a reduced metal oxide fluidized by the upwardly flowing gaseous reagents and reaction products to form a well defined upper level. The spent solid reducing agent, largely consisting of metal oxide, is continuously passed under the pseudo-hydrostatic pressure of a fluidized column of spent reducing agent to a regeneration zone wherein it is regenerated with a fluid reducing agent at reducing conditions of temperature and pressure in the form of a dense turbulent ebullient mass of finely divided solids fluidized by an upwardly flowing gas to form a well defined upper level. Finely divided regenerated metalliferous reducing agent is continuously returned to the hydrogen generation zone under the pseudo-hydrostatic pressure of a fluidized column of regenerated reducing agent.

In accordance with a preferred embodiment of my invention, the hydrogen generation zone is operated at a pressure substantially higher than that of the regeneration zone and the latter is located sufficiently high above the hydrogen generation zone to permit the maintenance of a fluidized solids column between the two zones, which exerts on its base a pseudo-hydrostatic pressure at least equal to the pressure of the hydrogen generation zone. This column may be used to pass regenerated solid reducing agent continuously from the low pressure regeneration zone to the high pressure hydrogen generation zone without affecting the uniformity of the reaction conditions and the continuity of operation in either zone.

It will be appreciated from the foregoing that my process may be operated continuously at optimum conditions. The increased surface of the finely divided metalliferous reducing agent permits the use of lower reaction temperatures and results in a greater percentage conversion of steam into hydrogen at conditions under which no danger of sintering, plugging or channelling exists.

Both the hydrogen generation and the regeneration reactions are endothermic or only slightly exothermic so that heat must be supplied to the system. This may be accomplished by preheating the solid and fluid reactants to suitable temperatures and supplying additional heat of reaction to either reaction zone. However, the necessary heat may be supplied in the most efficient manner by conducting the hydrogen generation at a substantially lower temperature than the regeneration and supplying at least a substantial portion of the heat required for the hydrogen generation in the form of a sensible heat of solids circulated from the regeneration zone to the hydrogen generation zone. Hydrogen generation temperatures of about 800°–1500° F., preferably 950°–1350° F., and regeneration temperatures of about 800°–1700° F., preferably 1200°–1500° F., are generally suitable for this purpose when the system $FeO \rightleftarrows Fe_3O_4$ is used. While it is generally preferable that regeneration be carried out at a temperature higher than hydrogen generation, operation with generation temperature higher than regeneration temperature may be employed if desired.

While the heat supply to the regeneration zone may be accomplished by applying equipment for the indirect supply of heat from an outside heat source, I prefer to generate heat within the regeneration zone by introducing fuel and an oxidizing gas together with the reducing material and conducting a limited combustion within the regeneration zone under overall reducing conditions.

A great variety of materials may be used as fuel and reducing material. When methane or similar hydrocarbon gases are used as fuel and/or reducing agent, temperatures in the neighborhood of 1400°–1500° F. should be employed, lower temperatures tending to promote the formation of hydrogen instead of reduced metal oxide and substantially higher temperatures lying in the range wherein reduced metal oxides such as iron or low oxides of iron tend to sinter and agglomerate. Mixtures of CO and $H_2$ such as watergas may also be used and usually at somewhat lower temperatures due to the large proportion of carbon present.

A particular advantage of my invention resides in the fact that even solid carbonaceous materials such as finely divided coal or coke may be charged to the regeneration zone as fuel and/or reducing agent, affording even higher proportions of carbon to hydrogen and permitting the use of still lower regeneration temperatures. In conventional fixed bed cyclic operation, the difficulties of solids distribution and temperature control are such as will cause the retention of appreciable amounts of carbon on the regenerated metallic agent when carbonaceous regenerating agents are used. This gives rise to the formation of carbon oxides in the hydrogen generation zone and to a consequent contamination of product hydrogen. The ideal conditions of materials- and heat-distribution in a fluidized solids mass of the type employed in accordance with my invention assure complete consumption of the total carbon present in the regeneration zone.

The amount of air and/or oxygen supplied to the regeneration zone for combustion depends on the amount of fuel required to be burned to generate the desired amount of heat. In general, about 0.1 to 1.0 lbs. of carbonaceous fuel and 0.15 to 2.5 lbs. of oxygen per lb. of carbonaceous reducing agent are sufficient to maintain the heat balance of the process when the metallic material circulated between the hydrogen generation and metal regeneration zones essentially comprises FeO and $Fe_3O_4$ and superheated steam of about 400° to 1100° F. and atmospheric to 300 lbs. pressure is supplied to the hydrogen generation zone.

The amount of heat-carrying solids circulated from the regeneration zone to the hydrogen generation zone should be sufficient to bring the inlet temperature of the latter zone at least to the desired reaction temperature. Reactor temperatures of about 950°–1350° F. may be established by circulating about 0.5–1.5 lbs. of iron in the form of FeO having a temperature of about 1200°–1500° F. or about 0.1–0.8 lbs. of iron in the form of Fe of the same temperature per standard cu. ft. of hydrogen to be produced. Solids circulation rates in the opposite direction should be substantially the same in order to maintain constant reaction conditions in the reaction zones.

Further considerable advantages may be realized from an adaptation of my invention to the use of any available "impure" or relatively undesirable hydrogen as the reducing agent and/or fuel to be supplied to the regeneration zone and to the ultimate manufacture of a "pure" or otherwise more desirable hydrogen, in a manner broadly analogous to the use of water gas as reducing agent for the metallic contact material. The use of such impure or relatively undesirable hydrogen allows practically complete utilization of the hydrogen in the reducing step, by recycling off-gases from the regenerator back to the regenerator after removal of water vapor by simple condensation.

The conditions of solids particle size, linear gas velocities, and densities of fluidized solids columns and reactor beds may be those generally employed in fluid solids operations. More specifically, solids particle sizes of about 20–400 mesh, preferably 100–200 mesh, linear gas velocities of about 0.1–5 ft., preferably 0.3–1 ft. per second and bed densities of about 10–150 lbs., preferably 15–75 lbs. per cu. ft. may be employed.

The height of the fluidized solids columns used to circulate the solids depends on the pressure differential between the hydrogen generation and metal regeneration zones. The hydrogen generation zone may be operated at pressures varying from atmospheric to 100 atmospheres or higher, pressures of about 5–20 atmospheres being preferred for the production of high pressure hydrogen used in the hydrocarbon synthesis over iron catalysts. For this purpose, a fluidized solids column having a height of about 50 to 200 ft. at a density of from about 50 to about 250 lbs. per cu. ft. may serve to circulate solids from an elevated regeneration zone to the hydrogen generation zone. The return circulation may take place in the form of a relatively dilute suspension under the pressure of the hydrogen generation or with the aid of a so-called reverse standpipe as will appear more clearly hereinafter.

The metalliferous material used for the steam reduction may be metallic iron which is oxidized to FeO, or preferably FeO which is oxidized to $Fe_3O_4$. Alloys of iron such as ferro-manganese, ferro-chrome, composites of copper oxides and iron, as well as tin oxides, various manganese oxides, or the like may also be used.

Having set forth its general nature and objects, my invention will be best understood from the following more detailed description wherein reference will be made to the accompanying drawing which is a semi-diagrammatic view of apparatus adapted to carry out a preferred embodiment of the invention.

Referring now to the drawing, the system illustrated therein essentially comprises a hydrogen-generating reactor 10 and a metal regenerator 30, the functions and cooperation of which will presently be described.

Superheated steam under a pressure of about 50-150 lbs. per sq. in., say about 105 lbs. per sq. in. is supplied to line 1 wherein it is mixed with reduced metallic material say substantially FeO having an average particle size of about 200 mesh supplied from, and substantially at the temperature of, regenerator 30 through standpipe 40 as will appear more clearly hereinafter. A suspension of finely divided FeO in steam, having a temperature of about 1200° F., passes under the pressure of the steam and the pseudo-hydrostatic pressure of the fluidized solids column in standpipe 40 to the lower conical portion of reactor 10 which it enters through a distributing grid 5.

The linear velocity of the steam is so controlled that the FeO forms, above grid 5, a dense ebullient mass of solids fluidized by the upwardly flowing steam and hydrogen generated to form a well defined upper level 8 at a bed height of about 5-25 ft. and a pressure of about 100 lbs. per sq. in. A superficial gas velocity of about 0.3-1 ft. per second within reactor 10 is suitable for this purpose at the particle sizes above specified. The fluid solids bed in reactor 10 assumes a uniform temperature of about 1100° F. at which rapid reduction of steam into hydrogen takes place.

Hydrogen of about 100 lbs. pressure containing unconverted steam passes overhead from level 8 through a conventional gas-solids separator, such as cyclone 12 and through line 14 to a conventional recovery and storage system (not shown) or to any desired use such as a synthesis reactor preferably after heat exchange with process fluids. Solids separated in cyclone 12 may be returned through pipe 13 to the fluidized bed in reactor 10. Cyclone 12 may also be arranged outside of reactor 10, if desired, downstream of suitable cooling means.

Finely divided oxidized solids of an average composition approaching $Fe_3O_4$ are withdrawn downwardly under the pressure of reactor 10 through line 16 and passed under said pressure upwardly through a reverse standpipe 18 provided with control valve 20 and communicating with low pressure zone 30. Reverse standpipe 18 is supplied with small amounts of a fluidizing gas such as air, methane or the like through one or more taps 19. It will be appreciated that the pressure in standpipe 18 decreases from bottom to top so as to cause the desired solids flow therethrough. The solids from pipe 18 may discharge into line 22 wherein they are picked up by air supplied from blower 24 at a pressure of about 5 lbs. per sq. in. or they may pass on through pipe 18a and valve 20a directly into regenerator 30.

The solids-in-air suspension formed in line 22 is passed to the lower conical portion of regenerator 30 which it enters through a distributing grid 26. A reducing and combustible gas such as methane is supplied to regenerator 30 via line 28. The amount of methane supplied must be sufficient to reduce the $Fe_3O_4$ present to FeO and, in addition, to consume all the available oxygen in a heat-generating combustion supplying the heat required to maintain the desired reduction temperature of about 1400° F. The linear gas velocities in regenerator 30 are such as will establish a fluidized bed having a level 27 above grid 26 and contact times similar to those specified for reactor 10. The pressure of regenerator 30 is preferably substantially atmospheric.

Spent reducing and flue gas leaves regenerator 30 through cyclone 32 and line 36 at substantially atmospheric pressure and the high temperature of the regenerator, to be discarded or used for suitable purposes, preferably, after heat exchange with process fluids. Solids separated in cyclone 32 may be returned to regenerator 30 through pipe 34. Cyclone 32 may be arranged outside regenerator 30 as described in connection with cyclone 12.

Fluidized solids having an average composition approaching $Fe_3O_4$ are withdrawn downwardly from regenerator 30 through standpipe 40 provided with steam aeration taps 42 and a control valve 44. Standpipe 40 should have a height of about 100 ft. between grid 26 and valve 44 at the pressure conditions here involved, to force the fluidized $Fe_3O_4$ through valve 44 under a pseudo-hydrostatic pressure of about 105 lbs. per sq. in. into steam line 1. The steam supplied through taps 42 is preferably preheated in heat exchange with spent gases from line 36 to avoid heat losses of the metal oxide on its path through standpipe 40.

When the solids circulation through standpipes 18 and 40 is maintained at about 1 lb. of iron per SCF of $H_2$ produced, no extraneous heat need be supplied to reactor 10 in addition to the sensible heat of the $Fe_3O_4$ and the preheat of the steam.

The system illustrated permits of various modifications in design and operation. For example, instead of using a reverse standpipe 18, the solids withdrawn from reactor 10 may be passed from line 16 directly into air line 22 or gas line 28 although this modification requires compression of the gases supplied to lines 22 or 28. Standpipe 50 may be provided alternatively or in addition to standpipe 40 to permit solids circulation from regenerator 30 to reactor 10 independent of the steam supply. Countercurrent flow of solids and gases may be arranged in either or both of zones 10 and 30 by establishing two or more superimposed fluidized beds, feeding the solids to the top bed and the gases to the lowermost bed while separating the beds by grids, such as grid 26a, provided with overflows 40a, as shown in regenerator 30, so that one or more additional levels 27a are formed. In this manner the size of the treating vessel may be reduced as a result of the more efficient utilization of the solid reactants.

The gaseous reducing agent and fuel supplied through line 28 may be replaced or supplemented by liquid or finely divided fluidizable solid agents such as liquid hydrocarbons, coal or coke of fluidizable particle size, etc. supplied through line 52 to regenerator 30. Metalliferous solids other than FeO and Fe₃O₄ may be selected from those mentioned above. Further modifications within the scope of my invention will occur to those skilled in the art.

My invention will be further illustrated by the following specific examples.

*Example I*

For the production of 12 million standard cu. ft. of hydrogen per day suitable operating conditions in a system of the type illustrated in the drawing are as follows:

| | |
|---|---|
| System | $3FeO + H_2O \rightleftharpoons Fe_3O_4 + H_2$ |
| Regenerator temperature | 1500° F. |
| Regenerator pressure | 5 lbs./sq. in. gauge |
| Reactor temperature | 1370° F. |
| Reactor pressure | 100 lbs./sq. in. gauge |
| Regenerator air | 23.4 MM. SCF/D |
| Natural gas to regenerator | 6.85 MM. SCF/D |
| Air+natural gas preheat | 1300° F. |
| Steam to reactor | 75,000 lbs./hr. |
| Steam preheat | 1000° F. |
| Solids circulation | 350 tons/hr. |
| Elevation of regenerator above reactor | 100 ft. |

*Example II*

For the production of 12 million standard cu. ft. of hydrogen per day using a relatively undesirable hydrogen as the reducing agent in the regenerator suitable operating conditions are as follows:

| | |
|---|---|
| System | $Fe + H_2O \rightleftharpoons FeO + H_2$ |
| Regenerator temperature | 1200° F. |
| Regenerator pressure | 5 lbs./sq. in. gauge |
| Reactor temperature | 1100° F. |
| Reactor pressure | 15 lbs./sq. in. gauge |
| Regenerator air | None |
| Total impure H₂ to regenerator | 30 MM. SCF/D |
| Net fresh impure H₂ | 13 MM. SCF/D |
| H₂—preheat | 1225° F. |
| Steam to reactor | 30,000 lbs./hr. |
| Steam preheat | 1125° F. |
| Solids circulation | 160 tons/hr. |
| Elevation of regenerator above reactor | 15 ft. |

The foregoing description and exemplary operations have served to illustrate specific applications and results of my invention. However, other modifications obvious to those skilled in the art are within the scope of my invention. Only such limitations should be imposed on the invention as are indicated in the appended claims.

I claim:

1. A continuous process for producing hydrogen by reacting steam with metalliferous reducing agents which comprises contacting steam in a hydrogen generation zone at a steam reducing temperature and an elevated pressure of between about 70 and 1500 lbs. per sq. in. gage with a dense, turbulent, ebullient mass of a finely divided solid metalliferous reducing agent fluidized by an upwardly flowing gas to form a well defined upper level, recovering hydrogen overhead from said level, withdrawing fluidized spent solid agent downwardly from said mass, passing withdrawn spent agent under the pseudo-hydrostatic pressure of a fluidized column of said spent agent upwardly to an elevated regeneration zone, contacting said spent agent in said regeneration zone with a fluid regenerating agent at a regenerating temperature and at a pressure substantially lower than said elevated pressure, in the form of a second dense, turbulent, ebullient mass of a finely divided solid fluidized by an upwardly flowing gas to form a well defined upper level, withdrawing fluidized regenerated solid reducing agent downwardly from said second mass, and passing withdrawn regenerated agent under the pseudo-hydrostatic pressure of a second fluidized column of said regenerated agent to said generation zone, said second column having a height not exceeding about 200 ft. and an apparent density of about 50 to 250 lbs. per cu. ft., and the differential between said elevated and lower pressures as determined by said height, amounting to about 70–300 lbs. per sq. in.

2. The process of claim 1 wherein said metalliferous reducing agent is predominantly FeO and said spent agent is predominantly Fe₃O₄.

3. The process of claim 1 wherein said height is about 100 ft. and said pressure differential about 100 lbs. per sq. in.

FRANK T. BARR.

REFERENCES CITED

The following references are of record in the file of this patent:

UNITED STATES PATENTS

| Number | Name | Date |
|---|---|---|
| 1,969,264 | Grant | Aug. 7, 1934 |
| 2,198,560 | Marshall, Jr. | Apr. 23, 1940 |
| 2,341,193 | Scheineman | Feb. 8, 1944 |
| 2,399,050 | Martin | Apr. 23, 1946 |
| 2,414,852 | Burnside et al | Jan. 28, 1947 |